United States Patent [19]

Wang

[11] Patent Number: 5,688,910

[45] Date of Patent: Nov. 18, 1997

[54] PROCESS AND APPARATUS FOR REMOVING UNPOLYMERIZED GASEOUS MONOMERS FROM OLEFIN POLYMERS

[75] Inventor: Duan Fan Wang, Somerville, N.J.

[73] Assignee: Union Carbide Chemicals & Plastics Technology Corporation, Danbury, Conn.

[21] Appl. No.: 533,771

[22] Filed: Sep. 26, 1995

[51] Int. Cl.[6] ............................................. C08C 3/02
[52] U.S. Cl. ....................................... 528/483; 96/204
[58] Field of Search .......................... 528/483; 96/204

[56] References Cited

U.S. PATENT DOCUMENTS

| | | | |
|---|---|---|---|
| 4,482,687 | 11/1984 | Noshay et al. | 526/125 |
| 4,758,654 | 7/1988 | Brod et al. | 528/483 |
| 4,994,534 | 2/1991 | Rhee et al. | 526/88 |
| 5,292,863 | 3/1994 | Wang | 528/483 |
| 5,478,922 | 12/1995 | Rhee et al. | 528/483 |

*Primary Examiner*—Thomas R. Weber
*Attorney, Agent, or Firm*—B. L. Deppenbrock

[57] ABSTRACT

There is provided a process and apparatus which utilizes a purger capable of handling different solids having different particle sizes and operating at a purge gas velocity higher than the minimum fluidization velocity of solids without gas channeling or solids backmixing. The purger has tapered walls and a conically-shaped, gas-permeable, solids-impermeable constraint means.

7 Claims, 1 Drawing Sheet

PROCESS AND APPARATUS FOR REMOVING UNPOLYMERIZED GASEOUS MONOMERS FROM OLEFIN POLYMERS

FIELD OF THE INVENTION

The present invention relates to a process and apparatus for removing unpolymerized monomers from solid olefin polymers. Particularly, the invention relates to a process for removing unpolymerized hydrocarbon monomers from a granular polymer of ethylene and/or propylene and one or more $C_4$ to $C_8$ alpha olefins and optionally a diene. More particularly, the invention relates to process for the removal of unpolymerized hydrocarbon monomers from "sticky polymers" such as ethylene-propylene diene terpolymers, polybutadiene, and polyisoprene.

BACKGROUND OF THE INVENTION

Environmental restrictions may prevent the direct venting to the atmosphere of higher boiling or liquid monomers such as residual unreacted monomers; and, more importantly, health and safety considerations generally require that these monomers be substantially removed from the solid polymer.

Operating a countercurrent purging process with a gas velocity high enough to expand or fluidize solid polymers inside a purger was first described in U.S. Pat. No. 5,292,863. In this patent a porous top-constraint means was used to suppress solids fluidization inside a columnar purger. With high gas velocity operation, very uniform gas distribution was obtained, and the purging efficiency was much improved. The pressure build-up inside the columnar purger, however, was observed to be higher than desired. Pressure build-up inside a columnar purger is proportional to the height of the purger and the purge gas velocity. When the height of a purger remains constant, the higher the operation gas velocity becomes, the higher the pressure build-up is inside the purger. High pressure build-up inside a purger not only has negative impact on the purging efficiency but also increases the chance that the solid will become packed. When solid polymer is packed inside a purger, it can not be discharged, thus, disrupting a countercurrent operation. To increase purging efficiency and minimize the packing of solids, the problem of pressure build-up inside a countercurrent expanded bed purger needs to be addressed.

More recently, copending application Ser. No. 08/272,099 filed Jul. 8, 1994, now U.S. Pat. No. 5,478,922, describes a countercurrent purging process using a tapered purger. A tapered purger has its cross-sectional area increased gradually from the bottom to the top. The purge gas velocity inside the purger, therefore, decreases gradually while it is traveling upward. The pressure build-up inside the purger is slow due to the decrease in the gas velocity. The unique feature of a tapered purger is that the purge gas velocity decreases gradually from the bottom to the top, thereby resulting in a purging process that operates with the gas velocity in the lower section of the purger higher than the minimum fluidization velocity ($U_{mf}$) of solids, and with the velocity in the upper section much lower than $U_{mf}$. Since solids in the upper section are swept with a purge gas velocity below $U_{mf}$, they are not fluidized, but rather form a stationary layer of solids. This layer of solids serves as a constraint means to prevent solids in the lower part of the purger from being fluidized. Therefore, a tapered purger can be operated with high gas velocities to achieve a countercurrent operation without using any build-in constraint means to suppress solid fluidization. The major drawback of this process is that it is not a robust process. That is, the tapered angle of the purger must be adjusted whenever the particle size of solids changes to ensure that the gas velocity in the upper section of the purger stays below $U_{mf}$. It is difficult to design a single purger capable of handling different solids having different particle sizes.

The present invention can be employed to accomplish these desired objectives.

BRIEF DESCRIPTION OF THE DRAWING

In FIG. 1, 1 is an inlet conduit for solid polymer entering the receiving hopper; 2 is a receiving hopper; 3 is an inlet for solid polymer entering the purge vessel; 4 is a cylindrical vessel having tapered walls; 5 is a gas chamber above the constraint member; 6 is a gas permeable and solid impermeable constraint member; 7 is a tapered wall of the vessel; 8 is a gas distributor plate; 9 is a plurality of tubes in the distributor plate; 10 is a conduit for entering purge gas; 11 is an inverted truncated cone-shaped transition element; 12 is a rotary valve; 13 is a discharge conduit for purged polymer product; 14 is a conduit for the exiting purge gas conveying the residual, unreacted monomer; and 15 is a conduit for the exiting solids conveying gas.

SUMMARY OF THE INVENTION

Figure 1:
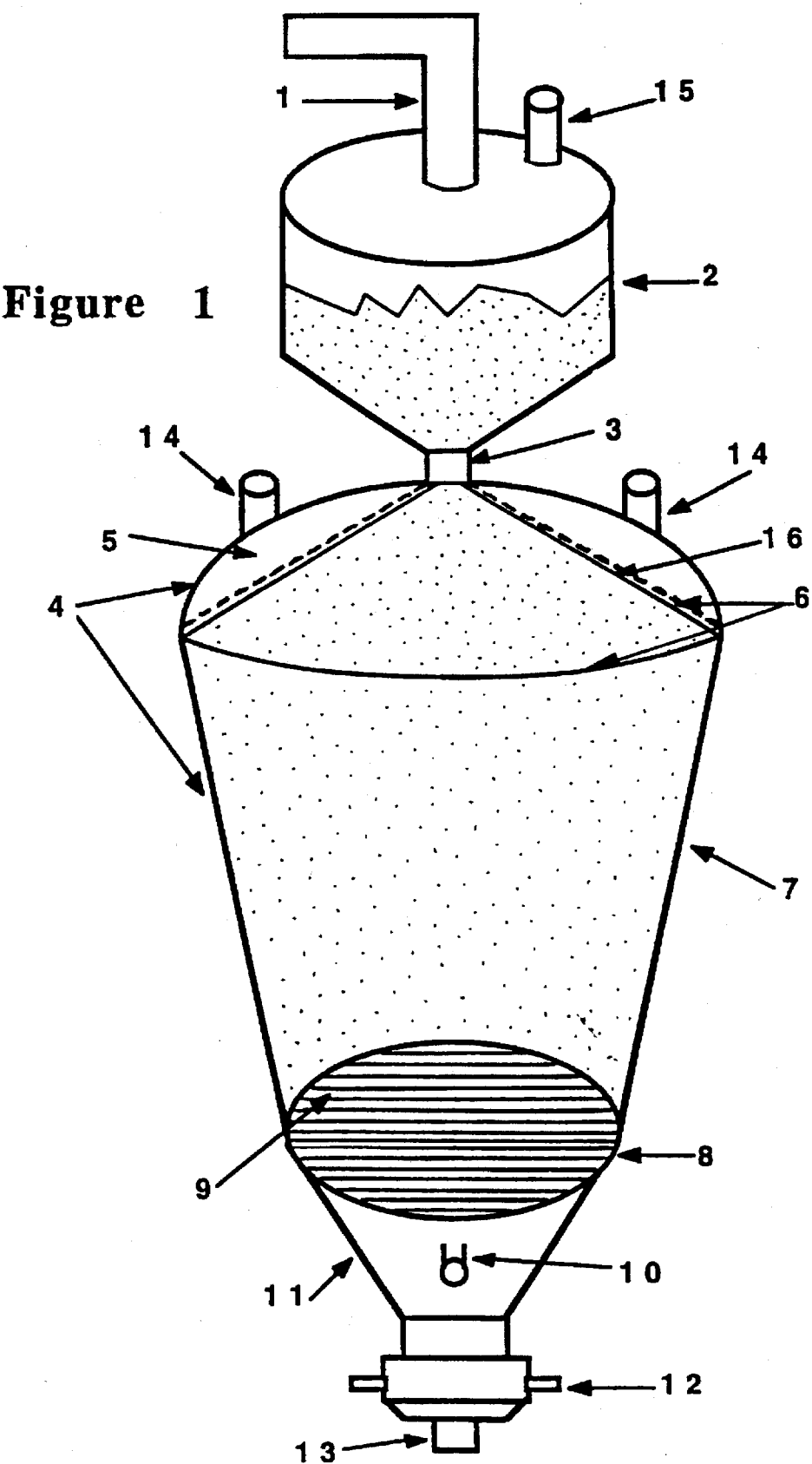
FIG. 1 represents a preferred purge vessel of the present invention with certain parts broken away to reveal interior details.

The present invention provides an apparatus for removing unpolymerized hydrocarbon monomers from a solid olefin polymer containing the monomers which comprises, a purge vessel having tapered walls wherein the wall has a height-to-bottom-diameter ratio of 0.5:1 to 10:1 and a tapered angle based on a vertical axis of 0.5 to 15 degrees; a solid discharge element disposed in the lower portion of the purge vessel; a solids receiving hopper; a solids inlet disposed in the receiving hopper; a feeding means disposed in the receiving hopper in communication with the inlet for feeding solids to the purge vessel; a gas permeable solids-impermeable constraint means disposed below the feeding means defining the upper limit of an expanded bed of solids and defining a gas collection chamber between the top of the purge vessel and the constraint means; a gas entry means disposed in the purge vessel within or below the expanded bed of solids; and a gas discharge means disposed in communication with the gas collection chamber for discharging gas therefrom.

In a preferred aspect, the apparatus of the present invention is directed to the purging of ethylene-propylene diene monomers (EPDM), polybutadienes, and polyisoprenes to reduce the amount of unreacted residual diene monomer such as ethylidenenorbornene (ENB), butadiene, or isoprene present in the polymer product.

DETAILED DESCRIPTION OF THE INVENTION

The solid olefin polymers to be purged can be produced by a variety of well known techniques such as high pressure, high temperature solution processess. A particularly preferred technique is to produce the solid olefin polymers by a gas phase fluidized bed process which utilizes a fluid bed reactor such as described in U.S. Pat. No. 4,482,687.

Solid olefin polymers which can be purged using the apparatus of the present invention are preferably granular. They can include polyolefins or alpha olefins such as, for example, homopolymers of ethylene or propylene, copolymers and terpolymers having a major mole percent of ethylene and/or propylene as the main monomer(s) and a minor mole percent of at least one $C_3$ to $C_8$ alpha olefin, a sticky polymers, polyvinyl chlorides, and elastomers such as polybutadiene, polyisoprene, ethylene-propylene rubbers (EPRs), and ethylene-propylene-diene monomers (EPDMs). The preferred $C_3$ to $C_8$ alpha olefins are propylene, butene-1, pentene-1, hexene-1,4-methylpentene-1, heptene-1, and octene-1. This description is not intended to exclude the use of this invention with alpha olefin homopolymer and copolymer resins in which ethylene is not a monomer. Examples of sticky polymers which can be benefited by the present invention include ethylene/propylene rubbers and ethylene/propylene/diene rubbers, high ethylene content propylene/ethylene block copolymers, poly(1-butene) (when produced under certain reaction conditions), very low density (low modulus) polyethylenes, i.e., ethylene butene rubbers or hexene containing terpolymers, ethylene/propylene/ethylidene norbornene, and ethylene/propylene/hexadiene terpolymers of low density.

For purposes of ease of description only, the present invention will be described herein with particular reference to EPDM terpolymers where applicable, although it is to be expressly understood that the invention is not to be limited thereby. Rather, it is the intention to be limited only by the scope of the claims appended hereto. The invention is preferably practiced with sticky polymers which have been rendered "non-sticky" such as by the process disclosed in U.S. Pat. No. 4,994,534 issued Feb. 19, 1991.

Depending upon the conditions of reaction and the particular diene monomer, the resulting polymer can contain an a mount of liquid and/or gaseous unpolymerized hydrocarbon monomers, (which can include ethylene, propylene, ethylidene norbornene, butadiene, or isoprene). The apparatus of the present invention is especially useful for purging higher boiling or liquid monomers such as ethylidene norbornene and butadiene.

FIG. 1 illustrates a preferred embodiment of the apparatus of the invention. Referring to FIG. 1, a receiving hopper 2 is provided with entry means such as conduit 1 for a solid polymer (resin) to be purged. The polymer is introduced into hopper 2 with a conveying gas such as nitrogen. Solid polymer is gravity fed from hopper 2 to a purge vessel 4 through a hopper discharge means such as discharge pipe 3. The cylindrical purge vessel 4 is adapted to accommodate an expanded bed of solids and has tapered walls 7. The height-to-bottom-diameter ratio of the vessel is 0.5:1 to 10:1, preferably 1.5:1 to 8:1, and most preferably is 1.5:1 to 3:1. The cross-sectional area of the vessel increases from the bottom to the top. The angle of the walls 7 is designed to minimize the pressure build-up inside the purge vessel 4 and is dependent upon the permeability of solid polymer and the amount of purge gas to be used. With a fixed purge gas velocity, the lower the permeability of solid polymer, the higher the pressure build-up. By using a large wall angle, the purge gas velocity is reduced, thus minimizing the pressure build-up in polymers with poor permeability. The larger the amount of purge gas used, the higher the pressure build-up. A large wall angle reduces the purge gas velocity, thus minimizing the pressure build-up. The tapered angle as measured along the vertical axis of the vessel can range from about 0.5 to 15 degrees, and preferably is about 3 to 10 degrees. Disposed beneath or below the discharge pipe 3 is a gas-permeable, solids-impermeable constraint means 6 which defines the upper limit of an expanded bed of solids. The constraint means utilized in this invention includes, for example, a porous conically shaped member 6 which extends from the end of discharge pipe 3 angularly to the inner periphery of purge vessel 4. The gas-permeable, solids-impermeable constraint means, e.g., conically shaped member 6, defines the upper limit of the expanded bed of solids and also defines a gas collection chamber 5 between the top of vessel 4 and the conically shaped member 6.

The discharge pipe 3 can be an independent element, preferably, however, it forms the upper portion of the conically shaped member 6 and is integral therewith.

As mentioned previously, the conically shaped member 6 defines the upper limit of the expanded bed of solids and is provided with perforations in an amount sufficient to permit passage of gas therethrough, preferably while preventing the passage of solids. Thus, conically shaped member 6 is provided with a perforated plate which is fabricated from an inert material such as aluminum or stainless steel and lined with at least one layer of screen with openings having a mesh size of from No. 1 to No. 300 or higher. The screen size and the number of layers of screens are dependent upon the particle size of the solids to be processed inside the bed. Thus, in general, the size of the openings in the perforated plate depends upon the particle size of the solid polymer to be purged. Openings should be of a size sufficient that in combination with the control of the amount and velocity of inert purge gas, there is achieved expanded bed operation as contrasted to a packed bed of normal fluidized bed operation. The distance of the free space between the constraint means, e.g., conically shaped member 6 and the top of the solids 16 in purge vessel 4 is significant. If the free space is larger than the maximum distance that a solid bed can be expanded by the fluidized gas, then the constraint means will not suppress the fluidization of the bed, and the whole bed will become a bubbling bed. To minimize the size of the free space, conically shaped member 6 is angularly disposed substantially parallel to the repose angle of solids. In other words, when vessel 4 is filled with solids, there will be more solids located at the center than at the sides of the vessel. It is this angle, i.e., the repose angle of solids, which dictates the angle of placement of conically shaped member 6, and as little free space as possible between solids 16 and conically shaped member 6, should be permitted. The angle of placement of conically shaped member 6 can range from 45 to 85 degrees, preferably is about 55 to 65 degrees.

The purge gas, preferably an inert purge gas (e.g., nitrogen or argon) is introduced into the vessel 4 at its lower end through conduit 10 and is directed through a gas distributing means such as distributor plate 8 which serves to provide uniform purge gas distribution. The gas distributor of choice should allow the solids to be discharged from the bottom of the bed and thus enable the solid bed to be operated in a countercurrent mode. As shown in FIG. 1, distributor 8 is positioned at the base of the purge vessel 4 in communication with conduit 10 and at a point slightly above a transition element 11. The transition element 11 has an inverted truncated conical shape and connects the tapered purge vessel 4 to the rotary valve 12. As known to those skilled in the art, the size of the transition element is determined by the bottom diameter of the purge vessel, the size of the rotary valve, and the mass flow. Such elements are readily commercially available. Gas distributor 8 can be provided with transversely extending tubes 9 which have openings through which the purge gas can enter the interior of the purge vessel 4. The openings and pattern of openings are such as to insure that enough back pressure can be built up so that purge gas is injected through all the openings evenly. The gas distributor to be used with the present apparatus is not limited to the type of gas distributor 8. Any gas distributor that is designed to give uniform gas distribution and to permit solids being discharged from the bottom of the vessel is suitable. A cone-skirt gas distributor and a perforated bottom cone gas distributor, for example, are these types of gas distributors and are commonly employed in the industry.

Conventional materials handling equipment and techniques can be employed in conjunction with the apparatus and process of the present invention. It is preferred, however, to use a purge vessel which has a conical portion as shown by reference numeral 11 in FIG. 1. In this case, in order to obtain the preferred flow of solid polymer, it may be necessary to utilize a conical insert or other means inside the bottom of the purge vessel. The height of this insert may be adjusted in order to provide the desired effect. Such inserts are commercially available. Dust collectors can also be utilized (although not shown in the drawing). The purpose of the dust collectors is to prevent the resin particles from being carried out of the top of the purge vessel with the exiting purge gas. Conventional dust collectors, such as commercially available bag filters, can be employed. Similarly, conventional coolers and blowers can be employed to provide the necessary materials handling capability and to control the temperature and pressure of resin and purge gas.

The inert purge gas is fed to purge vessel 4, through conduit 10, thence through distributor 8, and then upward through the constraint member 6, and finally, it enters gas collecting chamber 5 where it is discharged from vessel 4 through discharge ports 14. The purged solid polymers are discharged through gas distributor 8 into a transition element 11 and, thence into rotary valve 12 for discharge from the purging system through solid polymer discharge conduit 13.

The following examples will further illustrate the invention.

COMPARATIVE EXAMPLE 1

This example demonstrates an inadequate purging of ENB and a failure of operating a countercurrent process by using a constrained-columnar purger.

A batch of an ethylene-propylene ethylidene-norbornene diene terpolymer (EPDM) was prepared by the gas phase process disclosed in U.S. Pat. No. 4,994,534 at a rate of 10,000 lb/hr. The average particle size was 0.0315 inches with a standard deviation equal to 1.88. The residue of ethylidene-norbornene (ENB) in the EPDM polymer was 0.5 wt. % before any purging took place.

After polymerization, polymer is transferred from the reactor to the receiving vessel by conveying gas. Polymer is deposited in the receiving vessel and then is fed into the purge vessel by gravity. The purge vessel is a columnar vessel with a 10 foot diameter. The bed level is maintained constant at about 26 feet from the gas distributor. The operation temperature of the purge vessel is kept constant at 65° C.

With a nitrogen flow rate at 10,500 lb/hr., the superficial gas velocities are 0.534 and 0.338 ft/s at the bottom and the top of the tapered purger, respectively. The gas velocity inside the purger is above the minimum fluidization velocity of the resin; therefore, the purger is operated in an expanded bed mode. The total pressure build-up inside the purger is 9.4 psia.

After 4.8 hours of purging, the present operation fails to reduce the ENB residue from 0.5 wt. % to below 100 ppmw. Since there is 9.4 psia of pressure built-up inside the purger, polymer is slightly packed and difficult to discharge.

EXAMPLE 2

This example demonstrates the successful purging of ENB with a countercurrent process by employing the apparatus of the present invention.

A batch of an ethylene-propylene ethylidene-norbornene terpolymer (EPDM) prepared in Example 1 is transferred from the reactor to the receiving vessel by conveying gas. Polymer is deposited in the receiving vessel and then is fed into the purge vessel by gravity. The purge vessel is a tapered vessel similar to the one shown in FIG. 1. The diameter of the vessel at its bottom where the gas distributor is located is 10 feet and the tapered angle of the vessel wall is 4 degrees from the axis of the vessel. The bed level is maintained constant at about 20 feet from the gas distributor. The operation temperature of the purge vessel is kept constant at 65° C.

With a nitrogen flow rate at 10,500 lb/hr., the superficial gas velocities is 0.389 and 0.328 ft/s at the bottom and the top of the tapered purger, respectively. The gas velocity inside the purger is above the minimum fluidization velocity of the resin; therefore, the purger is operated in an expanded bed mode. The total pressure build-up inside the purger is 6.1 psia.

After 4.8 hours of purging, the present operation successfully reduces the ENB residue from 0.5 wt. % to below 100 ppmw. With purge gas sweeping uniformly through the resin bed, the ENB residue in the resin is gradually purged as the resin travels down the purger. Since the pressure build-up is low, polymer is not packed and discharges easily.

What is claimed is:

1. An apparatus for removing unpolymerized monomers from a solid olefin polymer containing the monomers which comprises: a purge vessel having tapered walls wherein the vessel has a height-to-bottom-diameter ratio of 0.5:1 to 10:1 and the walls have a tapered angle based on a vertical axis of 0.5 to 15 degrees; a solid discharge element disposed in the lower portion of the purge vessel; a solids receiving hopper; a solids inlet disposed in the receiving hopper; a feeding means disposed in the receiving hopper in communication with an inlet for feeding solids to the purge vessel; a gas-permeable, solids-impermeable constraint means disposed below the feeding means defining the upper limit of an expanded bed of solids and defining a gas collection chamber between the top of the purge vessel and the constraint means; a gas entry means disposed in the purge vessel within or below the expanded bed of solids; and gas discharge means disposed in communication with the gas collection chamber for discharging gas from the chamber.

2. The apparatus of claim 1 wherein the vertical angle is 3 to 10 degrees and the height-to-bottom-diameter ratio is 1.5:1 to 8.1.

3. The apparatus of claim 2 wherein the height-to-bottom-diameter ratio is 1.5:1 to 3:1.

4. A process for removing unpolymerized gaseous monomers from a mixture of a solid, granular olefin polymer and said gaseous monomers which comprises: countercurrently passing a purge gas through a bed of the mixture in the apparatus of claim 1; discharging the purge gas and unreacted gaseous monomer out of the apparatus; and discharging the granular olefin polymer from said apparatus.

5. The process of claim 4 wherein the polymer is:

(a) a homopolymer of ethylene or propylene;

(b) a copolymer of a major mole percent (>50%) of ethylene and a minor mole percent of one or more $C_3$ to $C_8$ alpha olefins;

(c) a copolymer of a major mole percent (>50%) of propylene of one or more $C_4$ to $C_8$ alpha olefins;

(d) a polyvinyl chloride;

(e) a polybutadiene or polyisoprene;

(f) a sticky polymer.

6. A process of claim 5 wherein the sticky polymer is selected from the group consisting of ethylene-propylene rubbers and ethylene-propylene-diene rubbers, high ethylene content propylene ethylene block copolymers, poly(1-butene), ethylene-butene rubbers, hexene containing terpolymers, ethylene-propylene ethylidenorbornene and ethylene-propylene hexadiene terpolymers.

7. The process of claim 5 wherein the polymer is polybutadiene or polyisoprene.

* * * * *